United States Patent [19]

Kemble

[11] Patent Number: 4,803,759
[45] Date of Patent: Feb. 14, 1989

[54] MANUALLY OPERATED BAG CLOSURE DEVICE

[76] Inventor: Edward J. Kemble, 1181 NW. 5 Ct., Pompano Beach, Fla. 33060

[21] Appl. No.: 209,859

[22] Filed: Jun. 22, 1988

Related U.S. Application Data

[63] Continuation-in-part of Ser. No. 71,403, Jul. 9, 1987, Pat. No. 4,763,388.

[51] Int. Cl.⁴ .................. A44B 13/02; B65D 77/10
[52] U.S. Cl. .................. 24/30.5 R; 24/238; 24/239
[58] Field of Search ......... 24/30.5 R, 30.5 L, 241 SL, 24/238, 239, 115 G, 523, 524

[56] References Cited

U.S. PATENT DOCUMENTS

| Re. 31,096 | 12/1982 | Johnston | 24/238 |
| 345,923 | 7/1886 | Riggle | 24/239 |
| 1,438,264 | 12/1922 | Rygh | . |
| 2,482,625 | 9/1949 | Kunkel | . |
| 2,701,402 | 2/1955 | Foster | 24/239 |
| 3,212,153 | 10/1965 | Lynch | . |
| 3,350,753 | 11/1967 | Hester | 24/239 |
| 3,604,069 | 9/1971 | Jensen | 24/239 |
| 3,861,007 | 1/1975 | Silverman | . |
| 4,097,967 | 7/1978 | Conner, Jr. | . |
| 4,188,686 | 2/1980 | Baum | . |
| 4,277,866 | 7/1981 | Song | . |
| 4,394,791 | 7/1983 | Groth | . |
| 4,622,723 | 11/1986 | Krauss | 24/115 G |

FOREIGN PATENT DOCUMENTS 677224  8/1952  United Kingdom .................. 24/238

Primary Examiner—Victor N. Sakran
Attorney, Agent, or Firm—John F. A. Earley; John F. A. Earley III; P. Michael Walker

[57] ABSTRACT

A manually operated bag closure device comprises a housing, a plunger, and a spring, and is manually operable between a bag insertion position and a bag closure position. The device is manipulable with one hand to overcome the force of the spring and locate the plunger relative to the housing at the bag insertion position, the neck of the bag being inserted into the passage with the plunger then being released to allow the spring to relocate the plunger relative to the housing at the bag closure position to grasp the neck of the bag and close it airtight.

4 Claims, 3 Drawing Sheets

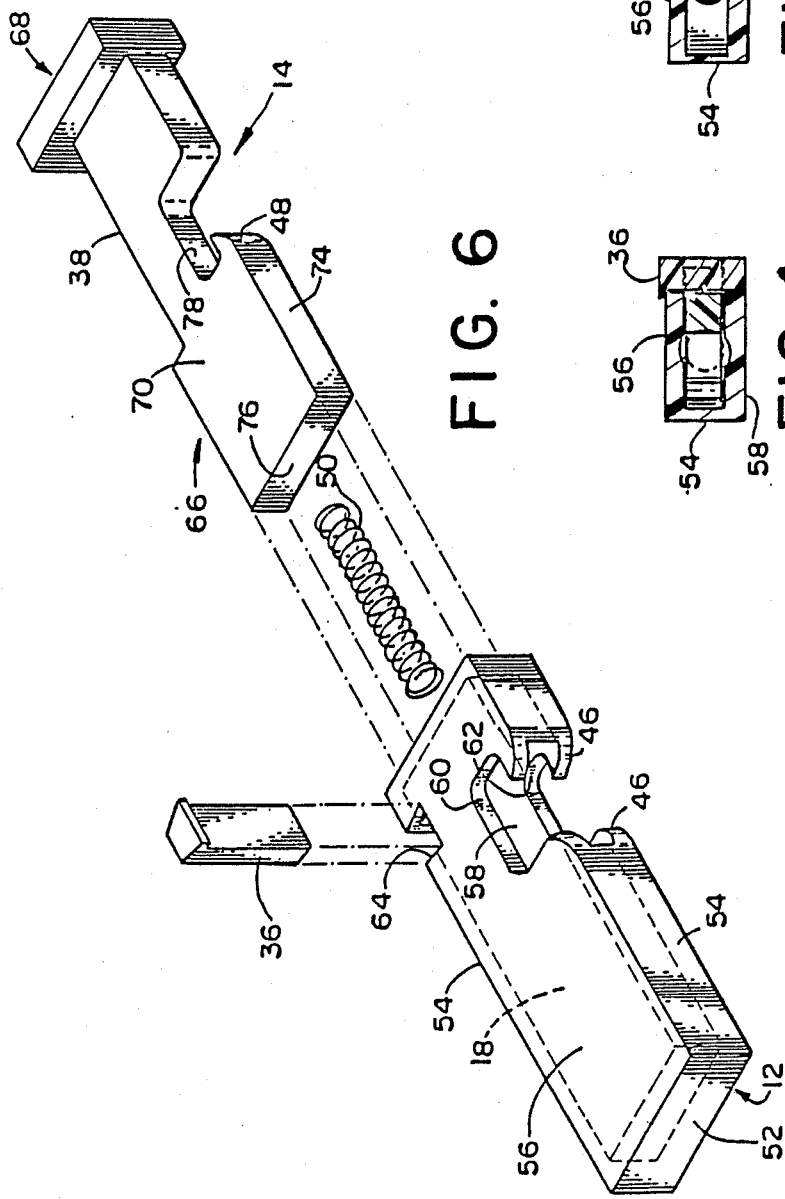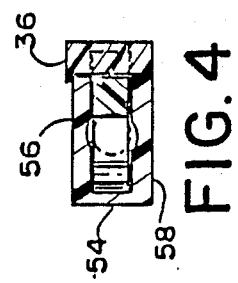

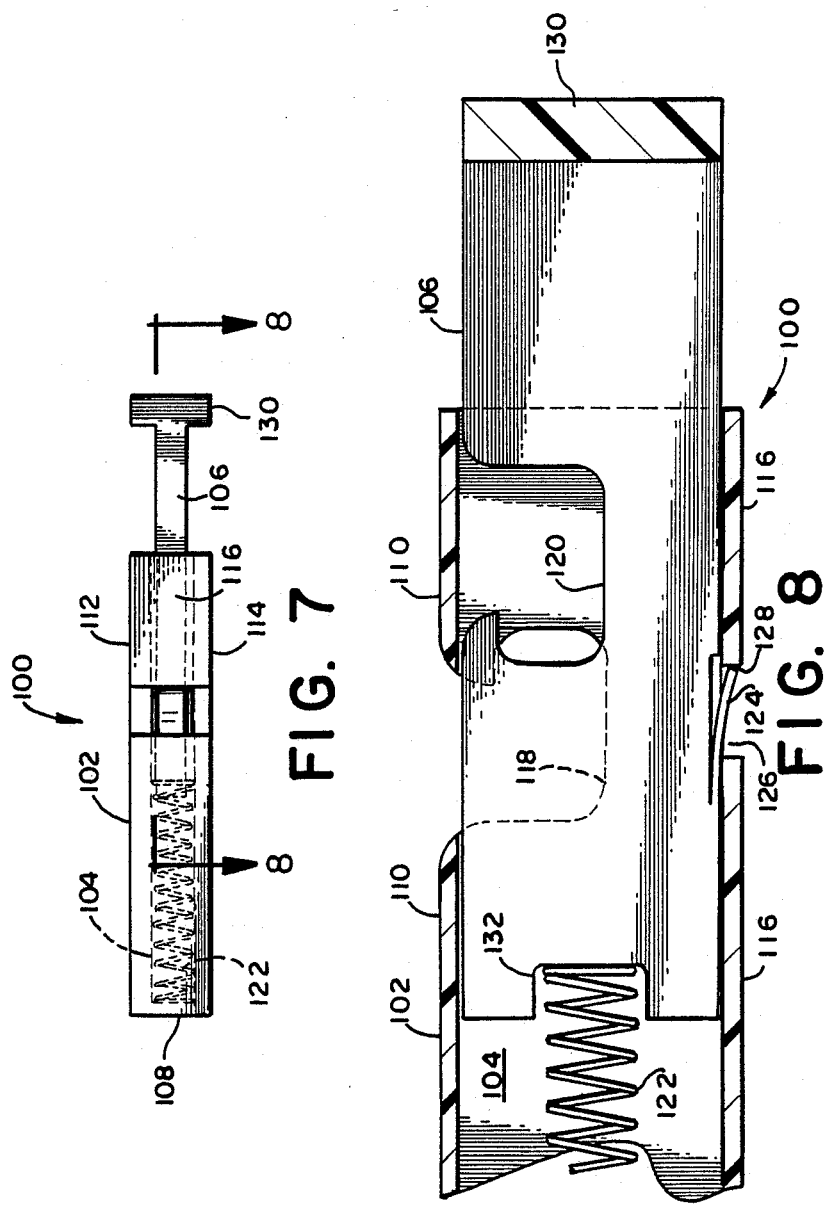

MANUALLY OPERATED BAG CLOSURE DEVICE

CROSS REFERENCE

This invention is a continuation-in-part of application Ser. No. 07/071,403 filed on July 9, 1987, now U.S. Pat. No. 4,763,388.

BACKGROUND OF THE INVENTION

This invention relates to a bag closure device which is manually operable to facilitate closing bags made of compliant material, such as the type made of plastic utilized to distribute and store items of food, such as a loaf of bread. More particularly, this invention relates to such a device which is easily used in the home and inexpensive to manufacture.

Many different items are distributed to consumers in bags which are closed by gathering the compliant material thereof which is disposed circumferentially at the neck of the bag opening and retaining the material and closing the bag with a wrapped wire or a plastic clip. As some of the items, like slices of bread, are taken periodically from the bag in the consumer's home it is often desirable to store the remaining items in the same bag for use. To do this, the bag must be regathered at its opening and the wire tie or plastic clip reapplied to retain the gathered material.

Although some very tricky techniques have been developed to reclose such bags, it is a cumbersome task at best and often presents severe problems which frustrate the consumer to such a degree that on occasion, all of the items are taken from the bag and stored in some other type of container. One very common technique is to dangle the bag with one hand while spinning it with the other hand to gather the material at the neck of the bag opening. While the bag is spinning, the wire tie or plastic clip is quickly retained in the spin hand and applied by the other hand about the gathered bag material at the neck. However, this technique is quite a bit more difficult than it sounds because the wire tie is very difficult to manipulate with one hand and the plastic clip often presents a problem when it is retained incorrectly in the spin hand or when the neck becomes too big due to excessive bag spin.

Many devices are known in the prior art for use in closing the open end of a flexible bag. Most of these devices apply pressure along a seam across the open end of the bag, such as with the clothespin like design utilized for the device disclosed and claimed in U.S. Pat. No. 4,394,791. However, such devices are inherently complex in design and consequently, high manufacturing costs are encountered therefor. Another such device is the heavy wire gauge hinge clamp such as that disclosed and claimed in U.S. Pat. No. 4,097,967. Because this clamp requires that the open end of the bag be threaded through the clamp opening prior to clamp activation, it is somewhat cumbersome to utilize. In devices of much greater sophistication and expense, the bag is fused closed with the application of heat or by cold flowing the bag material, as is disclosed and claimed in U.S. Pat. No. 4,188,686.

SUMMARY OF THE INVENTION

It is the general object of the present invention to provide a manually operated bag closure device which is easily manipulated with one hand.

It is a specific object of the invention to provide a manually operated bag closure device in accordance with the previously recited general object and which permits the neck of the bag opening to be inserted thereinto perpendicularly across the access axis of the bag opening.

It is another specific object of the present invention to provide a manually operated bag closure device in accordance with the previously recited objects and which operates to tightly gather the bag material at the neck of the opening about the access axis thereof in a substantially symmetric manner.

It is another specific object of the present invention to provide a manually operated bag closure device in accordance with the previously stated objects and which is designed for durability but is relatively inexpensive to manufacture.

The present invention accomplishes the previously recited objects with a housing and a plunger which are cooperatively configured and disposed to permit relative movement therebetween for locating the device at bag insertion and bag closure positions. The scope of this invention is limited only by the appended claims for which support is hereinafter set forth in the following specification and attached drawings that relate to a preferred embodiment of the invention.

DESCRIPTION OF THE DRAWINGS

FIG. 4 is a cross-sectional view through the bag closure device shown in FIG. 2 taken as indicated by the lines and arrows 4—4, and illustrates the depth to which the mortise and key penetrate through the side wall of the housing into the top and bottom walls thereof;

FIG. 5 is another cross-sectional view through the bag closure device shown in FIG. 2 taken as indicated by the lines and arrows 5—5; and illustrates how the travel limiting block is compatibly configured for disposition within a housing cavity and includes a hole from which the spring extends;

FIG. 6 is an exploded view of the bag closure device shown in FIG. 1 and illustrates the grooves and slots on both the housing and the plunger which cooperate to create a passage through the device that is much greater in size at the bag position than at the bag closure position;

FIG. 7 the side plan view of a bag closure device having an alternative embodiment of the plunger retaining means; and FIG. 8 a partial view in section taken along the lines 8—8 of FIG. 7 showing the details of the alternative embodiment of the plunger retaining means.

DESCRIPTION OF THE PREFERRED EMBODIMENTS

Figure 1:
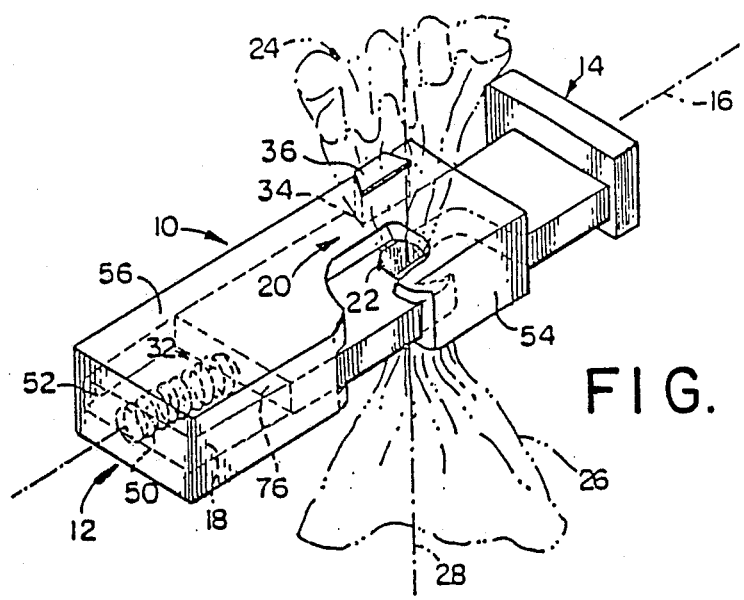
FIG. 1 is an isometric view showing the manually operated bag closure device of the invention with a bag disposed through the bag closure position thereof.

One preferred embodiment of the invention is illustrated in FIGS. 1 through 6, wherein the manually operated bag closure device 10 thereof is shown to include a housing 12 and a plunger 14 which are compatibly configured. The housing 12 is configured about a longitudinal axis 16 and has a cavity 18 extending thereinto from one longitudinal end thereof. The plunger 14 is compatibly configured with the cavity 18 and disposed therein for reciprocal movement along the longitudinal axis 16. A portion of the plunger 14 extends out of the housing 12 for controlling movement thereof into the cavity 18. Stop means 20 is included for retaining the plunger 14 within the housing 12.

As shown in FIG. 1, gathering means 22 is disposed on the housing 12 and plunger 14 for gathering the material, disposed circumferentially at the neck of an opening 24 into a bag 26, symmetrically about the access axis 28 into the bag 26. This gathering means 22 has a bag insertion position at one location of the plunger 14 relative to the housing 12, as shown in FIG. 3 and a bag closure position at another location therebetween, as shown in both FIGS. 1 and 2. From these figures, it may be seen that the bag insertion position exists at the end of plunger 14 movement into the housing 12, while the bag closure position exists at the end of the plunger 14 movement out of housing 12. As shown in FIG. 3, an access means or opening 30 is disposed through the device 10 for accessing the neck of the bag 26 into the gathering means 22 at the bag insertion position thereof, with the bag 26 passing thereinto in a direction perpendicularly across the bag access axis 28. Within the device 10, a bias means 32 is disposed for forcing the gathering means 22 toward the bag closure position.

When utilized to close the bag 26, the device 10 is manipulable with one hand to overcome the force of the bias means 32 and move the gathering means 22 to the bag insertion position, while dangling the bag 26 along the access axis 28 thereof, with the other hand. The neck of the bag is then inserted through the access means 30 into the gathering means 22, after which the force of the bias means 32 is released to move the gathering means 22 into the bag closure position. As is shown in FIG. 1, the neck of the bag is tightly gathered symmetrically about the access axis 28, when the gathering means 22 moves from the bag insertion position to the bag closure position.

Of course, the hand controlling the device 10 is then free to assist the other hand in applying a wire tie or plastic clip (not shown) to retain the tightly gathered material at the neck of the bag opening 24, if so desired. When such a wire tie or plastic clip is so utilized, the device 10 is again manipulated to the bag insertion position where the bag 26 is removable therefrom, to make the device 10 available for closing other bags.

Figure 2:
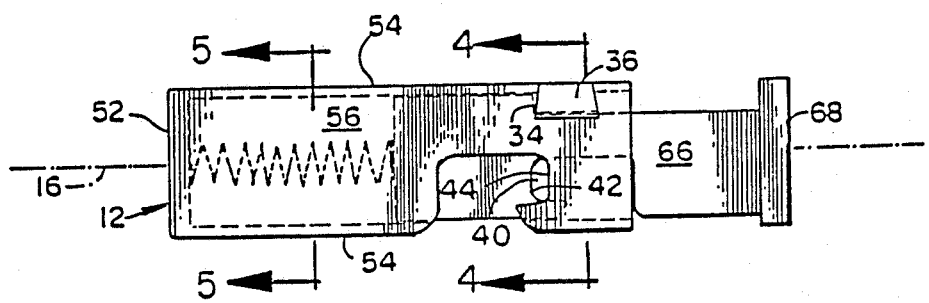
FIG. 2 is a plan view looking down on the bag closure device of FIG. 1 but without the bag being disposed therethrough.
Figure 3:
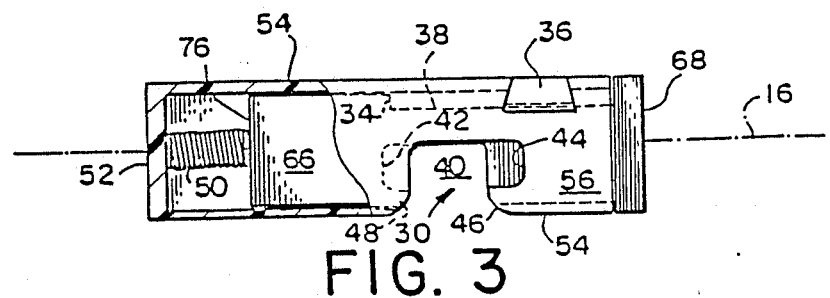
FIG. 3 is a plan view similar to that of FIG. 2 but with the bag closure device shown in the bag insertion position thereof and having a portion thereof cut away to show a spring which is retained therein by a block that limits travel of the plunger in one direction.

Although the means 20 for retaining the plunger 14 within the housing 12 may be implemented in many different ways within the scope of this invention, the particular implementation utilized is best illustrated in FIGS. 1, 2 and 3 wherein a shoulder 34 is disposed on the plunger 14 which comes to bear against a key 36 at the bag closure position of the device 10. The shoulder 34 is created by a recessed portion 38 on the plunger 14 which extends in a direction parallel to the longitudinal axis 16 out of the cavity 18 for at least the distance of plunger movement between the bag insertion and bag closure positions. The key 36 is fixedly disposed through the housing 12 and is mortised therein as a tenon having a dovetailed, cross-sectional configuration in the preferred embodiments of the device 10.

The gathering means 22 is implemented with a passage 40 through both the housing 12 and the plunger 14 which has a symmetrical configuration about an axis perpendicular to the longitudinal axis 16 at any position of the device 10, as is best illustrated in FIGS. 2 and 3. Separate wall portions 42 and 44 of the passage 40 are disposed on the plunger 14 and housing 12 respectively, and move cooperatively in opposite directions along the longitudinal axis 16 to greatly constrict the opening of the passage 40 about that axis of symmetry at the bag closure position. In the preferred embodiment of the device 10, the wall portions 42 and 44 are configured with a cylindrical contour.

Grooves 46 and 48 having substantially identical configurations, are disposed through the housing 12 and plunger 14 respectively, into the gathering means 22 at the bag insertion position of the device 10 to implement the accessing means 30, as shown in FIGS. 3 and 6. These grooves 46 and 48 pass through the device into the gathering means 22 in a direction perpendicular to both the longitudinal axis 16 and the bag access axis 28. As best illustrated in FIG. 6, the wall of the grooves 46 and 48 may be contoured to provide a lead for guiding the neck of the bag opening 24 into the gathering means 22.

To implement the bias means 32, a spring 50 is disposed between the housing 12 and plunger 14 to apply force therebetween for relative movement thereof along the longitudinal axis 16 toward the bag closure position. Although other spring arrangements and types of springs may be utilized, the coil spring illustrated in FIGS. 1 and 6 is utilized in the preferred embodiments of the invention.

The specific design and/or overall configuration of the device 10 illustrated in FIGS. 1-6 may be varied within the scope of the invention to incorporate other features thereinto or to accommodate particular fabrication techniques. For instance, a gripping feature could be incorporated by disposing "finger ears" (not shown) exteriorly on the housing 12 in a manner similar to a hypodermic syringe. Another possibility is for the device 10 to have an overall configuration that is generally cylindrical and thereby accommodate the fabrication thereof with rod and tube stock materials.

For the generally rectangular configuration illustrated for the device in FIGS. 1-6, the housing 12 and plunger 14 thereof may either be molded or fabricated from sheet stock materials, such as plexiglass. Construction details for both the housing 12 and plunger 14 are best illustrated in FIG. 6. Five walls are joined on the hollow, oblong housing 12, with one wall 52 being disposed at one longitudinal end thereof to serve as the bottom of the cavity 18. A pair of side walls 54 otherwise separate a top wall 56 and a bottom wall 58 which have a greater width horizontally across the longitudinal axis 16 than do the side walls 54 vertically across that axis, as best shown in FIG. 4. Slots 60 and 62 are disposed through the top and bottom walls 56 and 58 respectively, and are the contribution made by the housing 12 to the passage 40 through the device 10. These slots 60 and 62 are disposed along the longitudinal axis 16 and aligned thereacross along a vertical axis (not shown) perpendicular thereto, with their configurations being symmetrical about that vertical axis. The grooves 46 are disposed into the slots 60 and 62 across and through one of the side walls 54 and portions of the top and bottom walls 56 and 58. A dovetailed mortise 64 for the key 36 is disposed across and through the other side wall 54, with portions thereof extending into the top and bottom walls 56 and 58.

The plunger 14 includes a body 66 and a head 68 which remains external to the housing 12 and appears to be an end wall thereof when the device 10 is located in the bag insertion position, as shown in FIG. 3. The body 66 is compatibly configured with the housing cavity 18, having top and bottom surfaces 70, a pair of side surfaces 74, and an end surface 76 disposed thereon in corresponding relationship respectively, to the top and bottom walls 56 and 58, the side walls 54, and the end wall 52 on the housing 12. The recessed portion 38 is disposed as part of one side surface 74. As the plunger 14 contribution to the passage 40, a slot 78 is disposed through both the top and bottom surfaces 70, at a location along the longitudinal axis 16 and has a symmetrical configuration about a vertical axis (not shown) perpendicular thereto. The symmetrical configuration of the slot 78 about its vertical axis is substantially the same as the symmetrical configuration of the housing slots 60 and 62 about their vertical axis. The groove 48 is disposed across and through the other side surface 74, into the slot 78.

As shown in FIG. 1, the spring 50 is disposed along the longitudinal axis 16 between the housing end wall 52 and the plunger end surface 76 to exert a force which tends to locate the plunger 14 relative to the housing 12 at the bag closure position.

From the foregoing description it should be apparent that explanations are provided therein as to how the previously stated objects of the invention are accomplished. As explained, the manually operated bag closure device of the invention is easily manipulated with one hand because the grooves and slots on the housing and plunger cooperate at the bag insertion position of the device to permit insertion of the bag neck into the gathering means in a direction perpendicularly across the access axis into the bag opening. From the bag insertion position, the device is self-actuating to tightly gather the bag material at the neck about the access axis thereof in a substantially symmetric manner, while returning the housing and plunger to the bag closure position of the device. Because the housing and plunger are essentially the only parts which move relative to each other and that movement is reciprocal within the housing, the device is extremely durable. Except for the spring, all of the parts in the device can be either molded or made from stock materials, with very little machining and/or assembly thereof being necessary and therefore, the device is relatively inexpensive.

Key 36 is trapezoidal in cross section to fit in mortise 64, and is provided with a shoulder 37 that contacts the upper surface of top wall 56 to help hold key 36 in place in mortise 64 and to prevent key 36 from sliding completely through and out of mortise 64.

Turning now to FIGS. 7 and 8, there is shown a device 100 which includes an alternative embodiment of a plunger retaining means. Device 100 includes a housing 102 having a cavity 104 extending thereinto from one longitudinal end thereof. A plunger 106 is compatibly configured with the housing 102 and is disposed within cavity 104 for reciprocal movement therein.

Housing 102 comprises a base 108, a front wall 110, a pair of side walls 112, 114, and a rear wall 116. Housing 102 has a slot 118 formed in front wall 110 and side walls 112, 114. Plunger 106 also has a slot 120 formed therein which is approximately the same size as slot 118.

Device 100 has a bag insertion position for inserting the neck of a bag into device 100, and a bag closure position for securely closing the neck of the bag. In the bag insertion position, plunger 106 reaches a point of maximum travel into the housing 102 and the housing slot 118 and the plunger slot 120 are substantially aligned to create an opening which allows the insertion of the neck of a bag into slots 118, 120. In the bag closure position plunger 106 reaches a point of maximum travel out of the housing 102 and housing slot 118 and plunger slot 120 are substantially misaligned, with plunger slot 120 moving up into housing 102 to close the neck of the bag tightly.

Bias means, such a spring 122, is positioned in housing 102 between base 108 and plunger 106 for forcing plunger 106 from the bag insertion position to the bag closure position.

Device 100 further includes means for retaining the plunger 106 within cavity 104 against the force of spring 122. The plunger retaining means includes a projection 124 formed in plunger 106 and an aperture 126 formed in rear wall 116 of housing 102.

Projection 124, as shown in FIG. 8, extends upwardly and angles outwardly towards the exterior of cavity 104 so that when plunger 106 reaches the point of maximum travel out of cavity 104 projection 124 stops against an abutment surface 128 formed in rear wall 116 by aperture 126 to retain the plunger 106 in cavity 104 against the force of the spring 122. Aperture 126 is positioned on rear wall 116 so that when projection 124 stops against abutment surface 128, plunger 106 has moved out of cavity 104 far enough to close housing slot 118.

Plunger 106 further includes a plunger stop 130 formed in one end thereof which limits the travel of plunger 106 into housing 102 and a notch 132 formed in the end of the plunger 106 opposite the plunger stop 130 for keeping spring 122 in a proper position in housing 102.

In operation, device 100 works in substantially the same manner as device 10 as hereinbefore described, that is, to close the neck of a bag, plunger 106 is depressed to the bag insertion position where plunger 106 reaches a point of maximum travel into housing 102 and housing slot 118 and plunger slot 120 are substantially aligned. The neck of the bag is inserted in slots 118, 120, and plunger 106 is released so that spring 122 moves plunger 106 to its bag closure position where plunger 106 reaches the maximum point of travel out of housing 102 and housing slot 118 and plunger slot 120 are substantially misaligned. The misalignment of housing slot 118 and plunger slot 120 seals the neck of the bag.

Device 100 offers the advantage of having only three parts: housing 102, plunger 106 and spring 122.

Device 100 is simple to put together. Spring 122 is placed in cavity 104, and plunger 106 is slid into housing 102 until projection 124 slides over and snaps into contact with abutment surface 128 of rear wall 116. Because projection 124 projects at an angle as described above, it securely snaps against abutment surface 128 to retain plunger 106 in housing 102. Device 100 is therefore easy to put together, and is unlikely to accidentally come apart because of the secure fit between projection 124 and abutment surface 128 in rear wall 116 of housing 102. Device 100 is also easy to take apart, which makes it easy to clean.

I claim:

1. A manually operated bag closure device for closing the opened end of a bag comprising:
a housing having a cavity formed therein, a plunger compatibly configured with a housing and disposed therein for reciprocal movement in the cavity, a first slot formed in the housing, a second slot formed in the plunger, the device having a bag insertion position where the plunger reaches a point of maximum travel into the housing and the first and second slots are substantially aligned to allow the insertion of the neck of a bag therein, the device having a bag closure position where the plunger reaches a point of maximum travel out of the housing and the first and second slots are substantially misaligned to close the neck of the bag, bias means in the housing for forcing the plunger from the bag insertion position to the bag closure position, means for retaining the plunger within the housing cavity against the force of the bias means, the plunger retaining means including a projection formed in the plunger and an abutment surface formed in a rear wall of the housing, and the projection extending upwardly and angling outwardly towards the exterior of the cavity, whereby the projection stops against the abutment surface when the plunger reaches the point of maximum travel out of the cavity to retain the plunger therein.

2. The device of claim 1, wherein the bias means is a spring positioned in the cavity between the housing and the plunger.

3. The device of claim 1, wherein the plunger includes a notch formed in the plunger for positioning the bias means.

4. A manually operated bag closure device for closing the opened end of a bag made of compliant material and comprising:

a housing having a longitudinal axis and a cavity extending thereinto from one longitudinal end thereof;

a plunger compatibly configured with said housing cavity and disposed therein for reciprocal movement along said longitudinal axis, said plunger having a portion thereof extending from said housing cavity for controlling said movement thereinto;

cooperative means on said housing and said plunger for gathering material disposed circumferentially at the neck of the bag opening symmetrically about the access axis into the bag, said gathering means having a bag insertion position at the end of said reciprocal movement where said plunger reaches maximum travel into said housing cavity and a bag closure position at the end of said reciprocal movement where said plunger reaches maximum travel out of said housing cavity;

means disposed through said device for accessing the neck of the bag opening therethrough into said gathering means at said bag insertion position thereof, with the bag passing thereinto in a direction perpendicularly across the bag access axis;

bias means for forcing said gathering means on said plunger to said bag closure position; and means for retaining said plunger within said housing cavity against the force of said bias means, the plunger retaining means including a projection formed in the plunger and an abutment surface formed in a rear wall of the housing, the projection extending upwardly and angling outwardly towards the exterior of the cavity, whereby the projection stops against the abutment surface when the plunger reaches the point of maximum travel out of the cavity to retain the plunger therein, said device being manipulable with one hand to overcome the force of said bias means in locating said gathering means at said bag insertion position while dangling the bag along the access axis thereof with the other hand, and the neck of the bag then being insertible through said access means into said gathering means with said bias means being releasable to move said gathering means into said bag closure position at which the bag opening is closed with the neck thereof tightly gathered symmetrically about the access axis thereinto.

* * * * *